United States Patent
Sheets

(10) Patent No.: US 8,503,596 B2
(45) Date of Patent: Aug. 6, 2013

(54) WIRELESS CLOCK REGENERATION AND SYNCHRONIZATION

(75) Inventor: William Sheets, San Jose, CA (US)

(73) Assignee: AliphCom, San Francisco, CA (US)

( * ) Notice: Subject to any disclaimer, the term of this patent is extended or adjusted under 35 U.S.C. 154(b) by 1239 days.

(21) Appl. No.: 12/244,670

(22) Filed: Oct. 2, 2008

(65) Prior Publication Data
US 2010/0086093 A1 Apr. 8, 2010

(51) Int. Cl.
*H03D 3/24* (2006.01)
*H04L 7/00* (2006.01)

(52) U.S. Cl.
USPC .......................................... 375/376; 375/354

(58) Field of Classification Search
USPC .................................. 375/376, 354, 373, 371
See application file for complete search history.

(56) References Cited

U.S. PATENT DOCUMENTS

| | | | |
|---|---|---|---|
| 7,088,398 B1 | 8/2006 | Wolf et al. | |
| 2008/0040759 A1* | 2/2008 | She et al. | 725/81 |
| 2008/0106342 A1* | 5/2008 | Okamoto et al. | 331/18 |

FOREIGN PATENT DOCUMENTS

WO  WO 2007063689 A1 * 6/2007

OTHER PUBLICATIONS

Wimedia Alliance, "How it Works: UWB, WPAN and WiMedia Radio Space", Aug. 2008, pp. 8.
ECMA International, "High Rate Ultra Wideband PHY and MAC Standard", Standard ECMA-368, 2nd Edition, Dec. 2007, pp. 344, www.ecma-international.org.

* cited by examiner

*Primary Examiner* — Chieh M Fan
*Assistant Examiner* — Brian J Stevens
(74) *Attorney, Agent, or Firm* — Kokka & Backus, PC

(57) ABSTRACT

A method and apparatus are described for regenerating a local clock within a wireless module and synchronizing the local clock with a wireless host clock. For one embodiment, the wireless module generates a local clock, counts the cycles of the clock during a common timing reference period maintained wirelessly between the wireless module and the host, receives a count of the host clock during the same common timing reference period, and adjusts the local clock signal based upon a comparison of the two counts. For one embodiment, the wireless module further receives timing references from the host and, in addition, receives packets of audio samples from the host accompanied by a timestamp, the timestamp based upon the host timing reference, and outputs the audio sample at the time designated by the timestamp.

20 Claims, 5 Drawing Sheets

WIRELESS CLOCK REGENERATION AND SYNCHRONIZATION

FIELD

Embodiments of the present invention relate generally to an audio/video system with a wireless host communicating with wireless speakers. More particularly, these embodiments relate to regenerating and synchronizing a host clock in one or more wireless modules.

BACKGROUND

In the consumer electronics and computer industries, transmission of audio signals from a host player to remote device speakers has generally been accomplished over an analog, wired interface comprising speaker wires. With the advent of digital audio content, the desire to maintain the pristine digital audio signal as far as possible along the audio signal chain has motivated designers to pursue digital interfaces to replace signal-loss-prone analog speaker wires.

The High-Definition Multimedia Interface (HDMI) is an all-digital audio/video interface capable of transmitting uncompressed streams. HDMI provides an interface between any compatible digital audio/video source, such as a set-top box, a DVD player, a PC, a video game console, or an audio video (AV) receiver and a compatible digital audio and/or video monitor, such as a digital television (DTV).

FIG. 1 shows an example of a prior art audio/video multi-channel system 100 that includes a source 105, e.g., an HDMI AV receiver with a centralized amplifier, connected via an HDMI cable to HDMI DVD player 110 and also connected via an HDMI cable to a display 115, e.g., an HDMI television. The HDMI AV receiver 105 is also connected via analog speaker wires to a set of six speakers 120, each connected point-to-point from the HDMI AV receiver. Speakers 120 can be positioned to encircle a listener and create a realistic, three-dimensional audio experience.

Although wired digital interfaces offer high quality and fidelity, the ease of setup and mobility is lacking due to the constraints of the physical connections. Wireless links, such as WiMedia® ultra-wideband (UWB), are capable of transporting data for high quality, real-time streams, but data is only one element of a multi-channel, audio transmission. Timing information is essential for proper reproduction of the real-time data stream. Accurate control of the timing of the output of the speakers not only affects coordination of audio with a video stream, but also has an impact on distance and movement effects of the sound. For example, a slight delay in the audio output can create the effect of a greater distance between the listener and the origin of the sound.

Clock transportation and reproduction is typically not addressed by wireless links. Wired links transmit a clock signal to the various modules, but transmitting a clock signal wirelessly is typically limited in accuracy.

SUMMARY

A method and apparatus are described for regenerating a local clock within a wireless module and synchronizing the local clock with a wireless host clock. For one embodiment, the wireless module generates a local clock, counts the cycles of the clock during a common timing reference period maintained wirelessly between the wireless module and the host, receives a count of the host clock during the same common timing reference period, and adjusts the local clock signal based upon a comparison of the two counts. For one embodi-ment, the wireless module further receives timing references from the host and, in addition, receives packets of audio samples from the host accompanied by a timestamp, the timestamp based upon the host timing reference, and outputs the audio sample at the time designated by the timestamp.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements, and in which.

DETAILED DESCRIPTION

Embodiments of a method and apparatus for wireless clock regeneration and synchronization are described. For one embodiment, the wireless module generates a local clock, counts the cycles of the clock during a common timing reference period maintained wirelessly between the wireless module and the host, receives a count of the host clock during the same common timing reference period, and adjusts the local clock signal based upon a comparison of the two counts. For one embodiment, the wireless module further receives timing references from the host and, in addition, receives packets of audio samples from the host accompanied by a timestamp, the timestamp based upon the host timing reference, and outputs the audio sample at the time designated by the timestamp.

Figure 1:
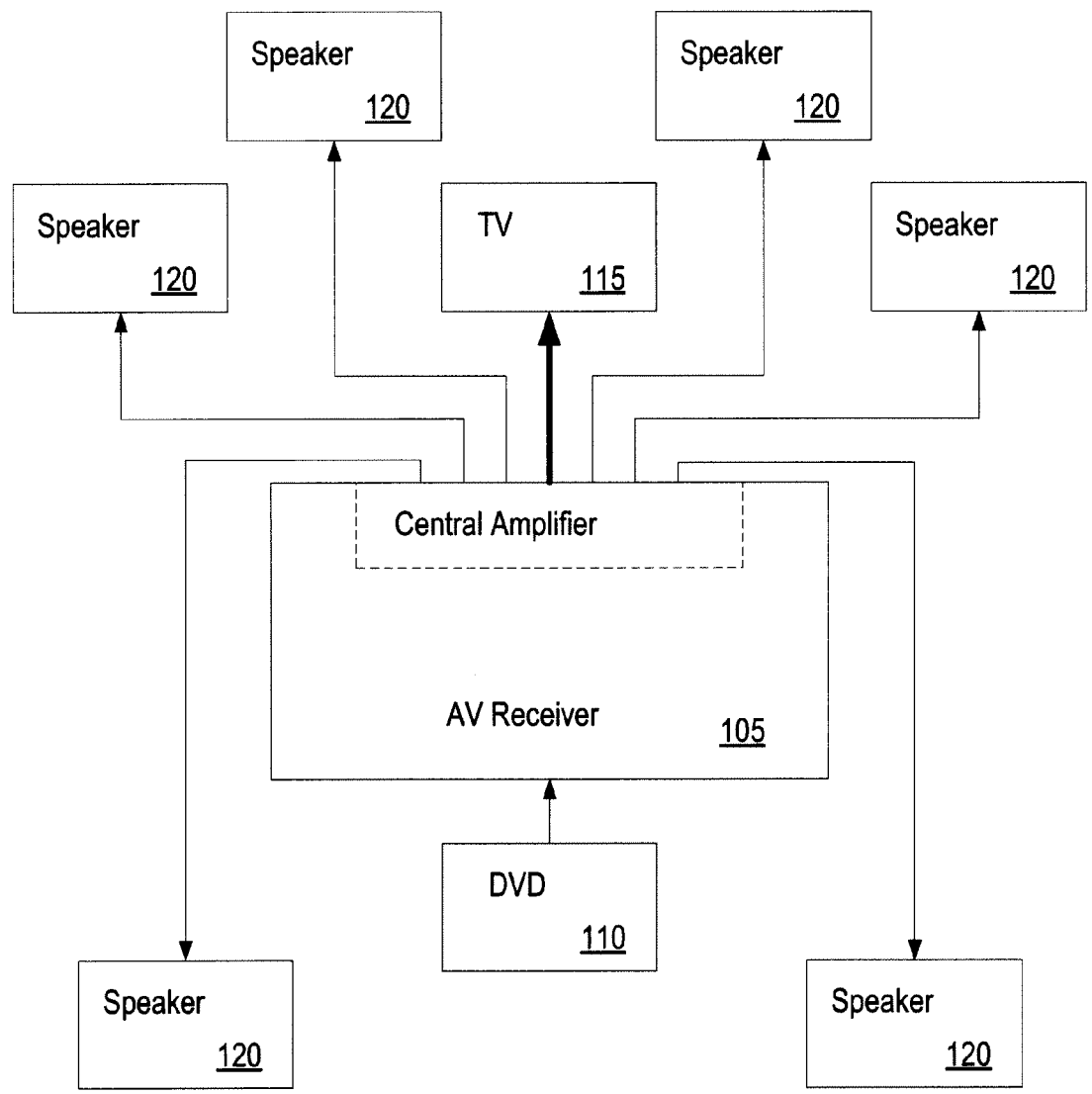
FIG. 1 shows a block diagram of an exemplary prior art, multi-channel audio/video system with various components connected by wire.
Figure 2:
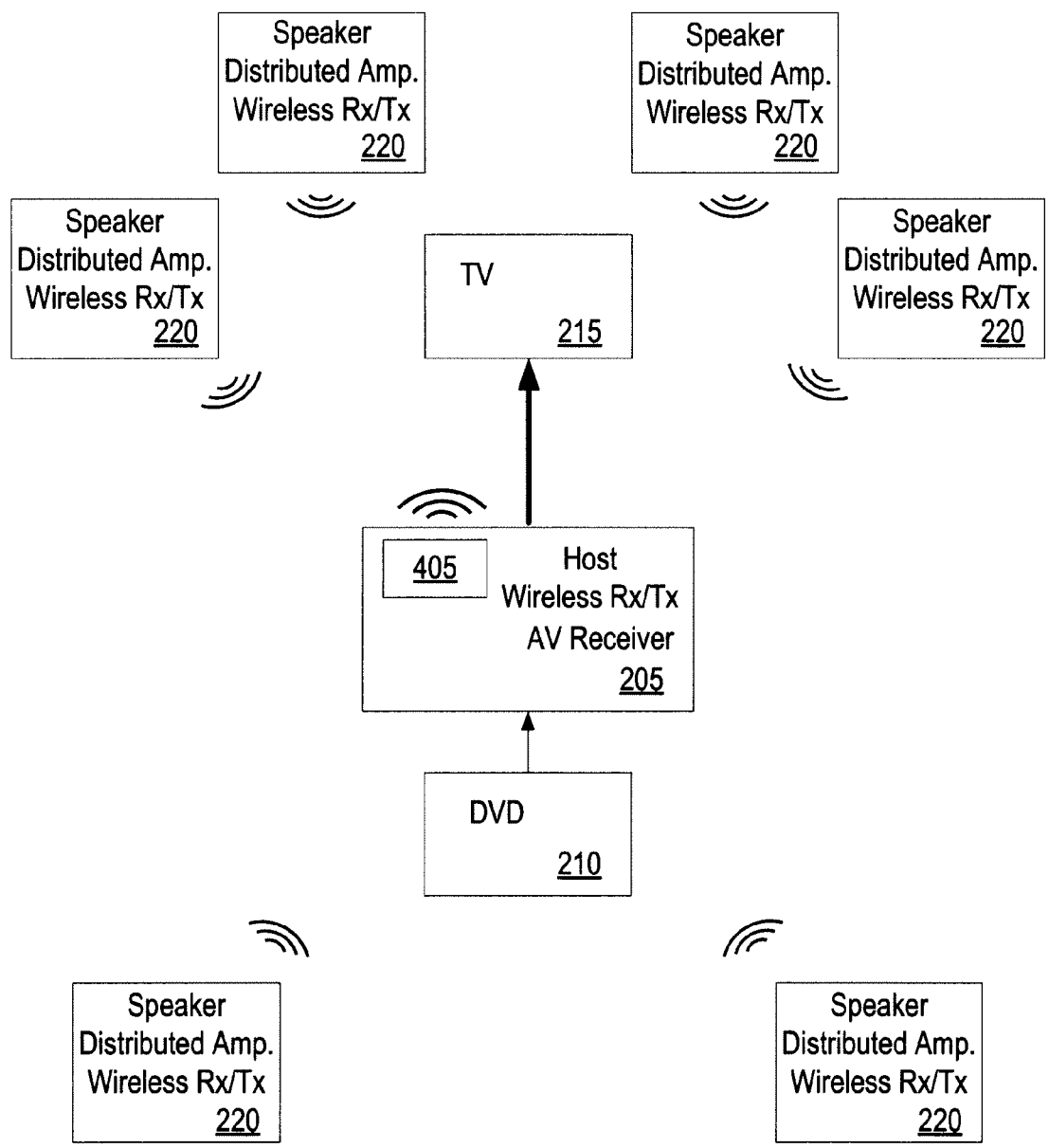
FIG. 2 shows a block diagram of an exemplary wireless multi-channel audio/video system in which an embodiment of the invention is implemented.

FIG. 2 shows a block diagram of an exemplary wireless, multi-channel audio/video system 200 in which an embodiment of the invention is implemented. Host 205 includes an AV receiver with a wireless host module. The Host 205 may include the functionality of a HDMI AV receiver compatible with HDMI components. For one embodiment, the audio/video system 200 further includes a plurality of wireless speakers 220 each including a wireless module to enable communication with the host AV receiver 205. The wireless modules and host may communicate unidirectionally or bidirectionally. For another embodiment, each wireless speaker 220 further includes an amplifier matched to a driver of the respective speaker to optimize the frequency response of the driver.

For one embodiment, the audio/video multi-channel system 200 includes an AV receiver 205 connected via cable to DVD player 210 and a television (TV) 215. For one embodiment, the DVD player 210 is omitted or replaced by another AV device, for example, a television broadcast receiver. For another embodiment, one or more of the AV devices, such as the AV Receiver 205, DVD player 210, and TV 215, are integrated within a single device. This consolidation is possible within the wireless audio topology because a major portion of the AV receiver functionality, a centralized amplifier for the speakers, is distributed to each of the speakers. For an alternative embodiment, a wireless host module resides within one or more of the other AV devices.

For one embodiment, the topology between host and wireless modules is point-to-multipoint, implemented via Ultra Wide Band (UWB) host/device architecture. Embodiments of the invention are described in reference to the wireless transmission of audio data. Nevertheless, the wireless clock generation and synchronization described herein applies to the wireless transmission of other data as well, for example, video data.

For one embodiment, the host 205 and wireless devices 220 have the ability for bidirectional communications over the wireless link, as depicted with the wireless beacon-like icons. The majority of the data transferred in an audio application is from the host 205 to the wireless devices 220. Nevertheless, important data is transmitted by the wireless devices 220, such as a beacon to coordinate a common timing reference, acknowledgements of data transfers, application-specific information, etc.

Host 205 also includes Control Logic 405, described in more detail below.

Figure 3:
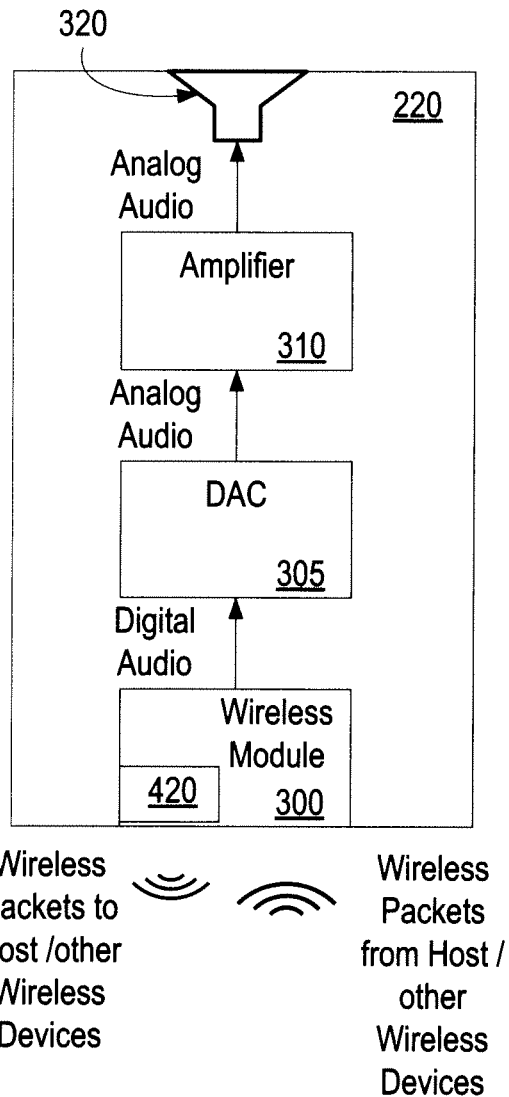
FIG. 3 shows a block diagram of an exemplary speaker in which an embodiment of the invention is implemented.

FIG. 3 shows a block diagram of an exemplary wireless speaker 220 in which an embodiment of the invention is implemented. The wireless speaker 220 includes a wireless module (WM) 300. For one embodiment, the WM 300 receives wireless audio data and auxiliary packets from the Host 205 and other wireless devices, as well as transmits auxiliary information to the Host 205 and other wireless devices. For one embodiment, the wireless speaker 220 includes an audio digital-to-analog converter (DAC) 305, which takes in the digital audio data from the WM 300, and converts it to analog. The DAC 305 sends the analog signal to the audio amplifier 310, which can be specifically designed to match the speaker driver 320, as it is resident in the same enclosure as the speaker driver 320 in this topology. Finally, speaker 320 outputs the analog audio data.

Wireless module 300 also includes Control Logic 420, described in more detail below.

Figure 4:
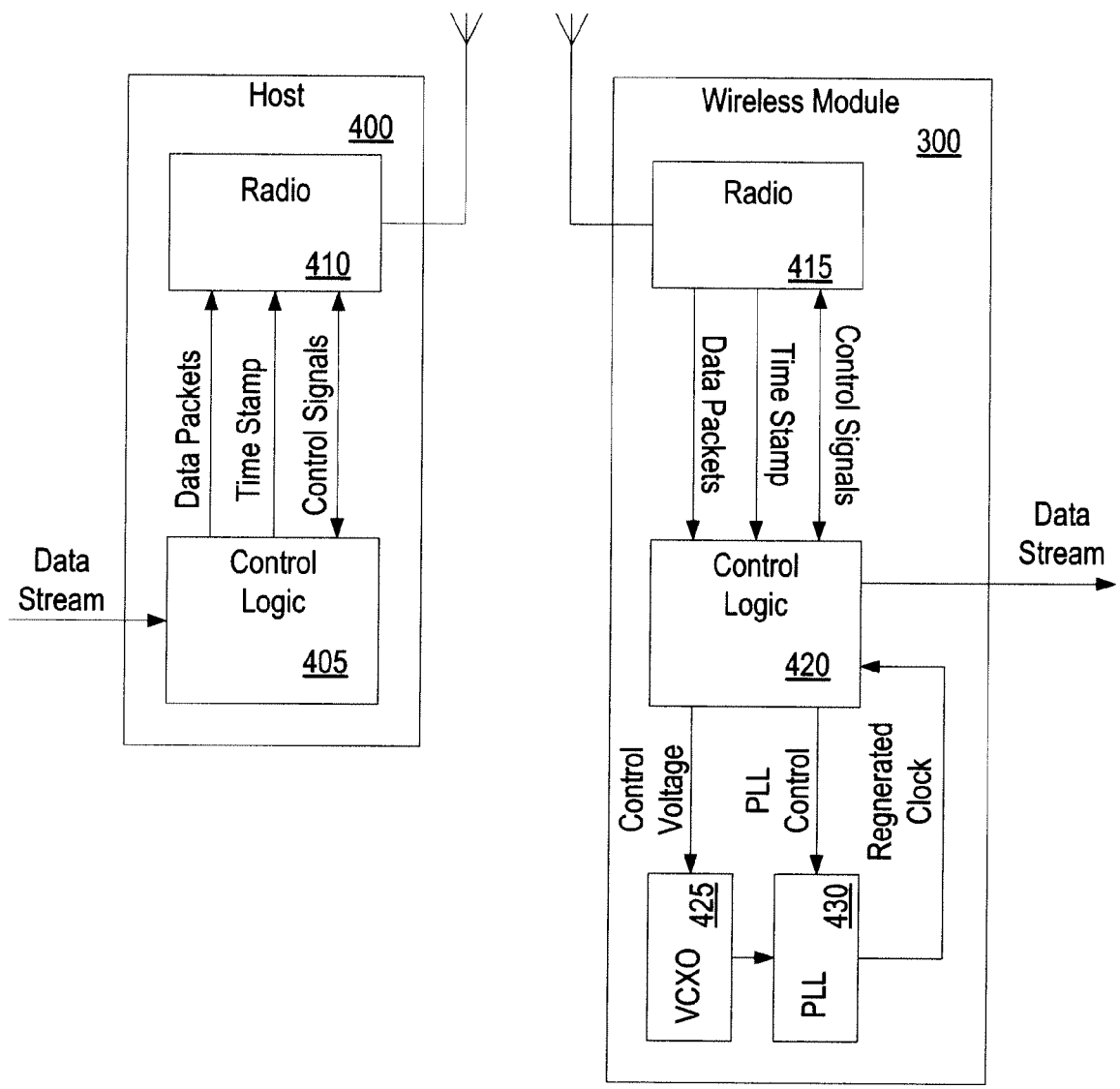
FIG. 4 shows block diagrams of the host and wireless module according to one embodiment of the invention.

FIG. 4 shows block diagrams of the host and WM according to one embodiment of the invention. Host device 400 includes Control Logic 405 to manage the operation of Host device 400. Control Logic 405 receives a data stream and sends packetized data to Radio 410 to be transmitted to a WM 300. In addition to data packets, Control Logic 405 generates a timestamp that accompanies the data packet transmitted to the WM 300. For one embodiment, the data packet is composed of audio samples and a timestamp that indicates when the first audio sample of the data packet is to be played with respect to the host timing reference. For an alternative embodiment, the data packet is composed of video samples and a timestamp that indicates when the first video sample of the data packet is to be played with respect to the host timing reference. For one embodiment, the timestamp is based upon a host clock. For an alternate embodiment, the timestamp is based upon a derivative of the host clock.

For one embodiment, Control Logic 405 includes a host clock. For an alternate embodiment, the Control Logic 405 receives a host clock signal along with the real-time data stream. For one embodiment, the Host 400 uses the host clock and a beacon pulse to wirelessly maintain a common timing reference. For one embodiment, the Radio 410 generates and transmits a beacon pulse as a control signal to one or more WM's 300 at a regular, predetermined period. For example, for one embodiment, the Radio 410 broadcasts a beacon pulse every 65 milliseconds. For an alternate embodiment, the Control Logic 405 generates a beacon pulse to be transmitted by the Radio 410 as a control signal to one or more WM's 300 at a regular, predetermined period of the host clock.

Although FIG. 4 only includes a single WM 300, one embodiment includes a plurality of WM's 300, e.g., as shown in FIG. 2. The WM 300 includes a Radio 415 to receive data packets and associated timestamps and send and receive control signals, e.g., a beacon pulse used as a common timing reference. The WM 300 further includes Control Logic 420. For one embodiment, the data packets contain audio samples and Control Logic 420 processes the received data stream to send the data packets to be outputted by a speaker at a time based upon the received timestamps associated with the data packets. For one embodiment, the WM 300 outputs the audio samples at the time indicated by the timestamp. For an alternate embodiment, the WM 300 outputs the audio samples at a time indicated by the timestamp plus or minus a predetermined or programmable delay. The WM 300 uses a local clock to determine the timing of the data stream according to the timestamps. To achieve accurate timing and high quality sound, the local clock and Host clock are synchronized.

For one embodiment, the WM 300 utilizes a voltage-controlled crystal oscillator (VCXO) 425 and a phase-locked loop (PLL) 430 to generate a local clock signal and synchronize it with the Host clock. For one embodiment, WM 300 is preprogrammed with the frequency, or a derivative thereof, of the Host clock. For an alternate embodiment, Host 400 transmits the frequency, or a derivative thereof, of the Host clock to one or more WM's 300 and Control Logic 420 sets the local clock frequency based upon the received transmission. For yet another embodiment, Control Logic 420 determines the Host clock frequency from one or both of the data packets and timestamp received from the Host 400 and sets the local clock frequency based upon the determination.

For one embodiment, Control Logic 420 sends a control voltage to the VCXO 425 and PLL control signals to the PLL 430 to generate and fine-tune the local clock at a desired frequency. For one embodiment, the PLL 430 output will be very close to the desired frequency but will not track the Host clock exactly due to minute dynamic variations that result in clock drift. For example, the desired frequency for both the Host clock and the local clock may be 96,000 Hz, but the actual frequency of the Host clock may be 95,999 Hz and the actual frequency of the local clock may be 96,001 Hz. To overcome the resulting clock drift, the Control Logic 420 makes fine and unique corrections via the VCXO 425 by referencing a common timing period.

For one embodiment, the Radio 415 generates and transmits a beacon pulse at the same predetermined period as the Radio 410 to maintain the common timing reference. For one embodiment, WM 300 is preprogrammed with the predetermined period. For an alternate embodiment, Host 400 transmits the predetermined period to a WM 300 and the Control Logic 420 sets the period based upon the received transmission. For yet another embodiment, the WM receives a plurality of beacon pulses from the Host 400 and the Control Logic 420 determines the beacon period and sets the WM beacon period accordingly.

For one embodiment, a common beacon period is maintained by the Host 400 and WM's 300 transmitting a beacon pulse based on the predetermined period. The devices will receive the beacon pulses from one another. For one embodiment, the devices use a predetermined algorithm to maintain a minimum variation in the time between the transmission of the first beacon pulse and the last beacon pulse. For example, the system may require the Host 400 and all WM's 300 to transmit a beacon pulse within a six millisecond window and, if any device falls outside of that window, one or more of the devices delay the timing of their individual beacon pulses to more closely match the timing of the beacon pulse that was last in time.

For one embodiment, the WM 300 determines variations between the local clock and the Host clock by counting a number of local clock cycles that occur during the predetermined beacon period and comparing the count against a similar count performed by the Host 400. The Host 400 transmits a count of the Host clock, or a derivative thereof, to a WM 300. For one embodiment, the Host clock control transmission includes both the number of Host clock cycles during a beacon period and a designation of the beacon period, e.g., quantized to the periodic beacon interval, as the clock count. For an alternate embodiment, the transmitted count includes a total accumulation of Host clock cycles. During an initialization of a WM 300, the Control Logic 420 will discard its own count and set the WM count to match count received from the Host 400. Once the WM 300 has been initialized, Control Logic 420 will compare its own count against the received Host count and adjust the local clock accordingly. For example, if the Host count is greater than the WM count, the local clock is slow. Similarly, if the Host count is less than the WM count, the local clock is fast.

For an alternate embodiment, another programmable oscillator that is suitable for clock regeneration, such as a voltage-controlled oscillator (VCO), a temperature-compensated VCXO (TCVCXO), a digitally controlled oscillator (DCO), or other programmable oscillator known in the art. For an alternative embodiment a delay-locked loop (DLL) or similar circuit known in the art is used instead of a PLL. For yet another embodiment, a programmable oscillator can be omitted if the PLL 430 has fine enough control. The PLL would not be programmed to the exact frequency of the Host clock, but rather would "ping-pong" between two settings close to the frequency, resulting in a time average that would match the Host clock. This may result in wider frequency variations, depending on the level of control offered by the PLL. Nevertheless, data rate converter technology such as sample rate converters for audio and scalers and frame rate converters for video may be used to eliminate the resulting jitter to achieve an acceptable synchronization.

Figure 5:
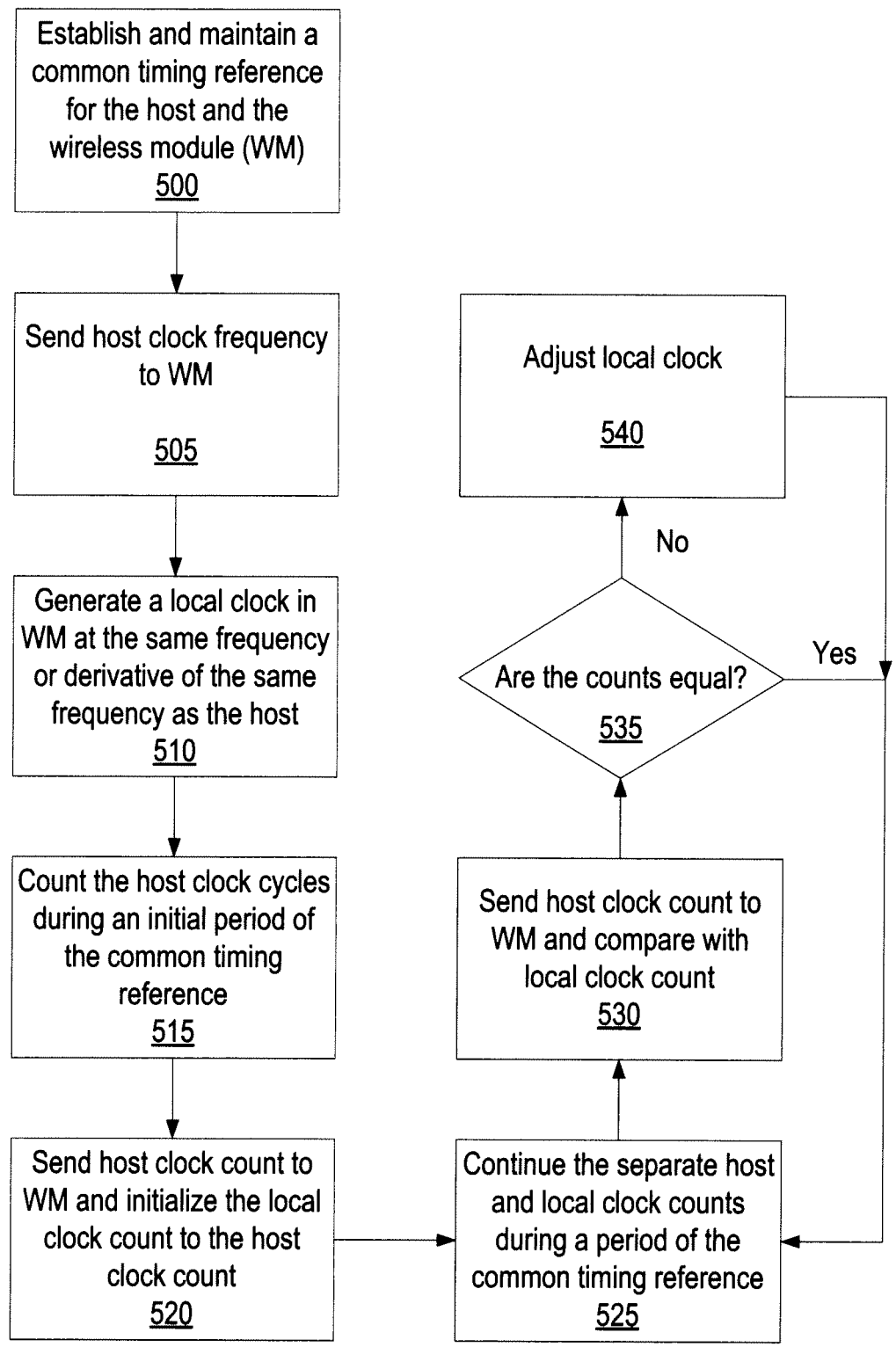
FIG. 5 shows an exemplary flow chart for a method for regenerating and synchronizing a local clock within a wireless module according to one embodiment of the invention.

FIG. 5 shows an exemplary flow chart for a method for regenerating and synchronizing a local clock within a WM according to one embodiment of the invention. At block 500, a common timing reference between the Host 400 and WM 300 is established and maintained. At block 505, the Host 400 transmits the Host clock frequency, or a derivative thereof, to the WM 300. At block 510, WM 300 generates a local clock frequency at the same frequency, or derivative thereof, as the Host clock. At block 515, Host 400 counts the number of Host clock cycles during an initial period of the common timing reference. At block 520, the Host 400 transmits the initial count and a timestamp reference to the common timing reference and the WM 300 sets its own count to match the Host count. At block 525, both the Host 400 and the WM 300 continue the count based upon their own respective clock cycles during the common timing reference period. At block 530, the Host 400 transmits the Host clock count to the WM 300 and the WM compares the Host clock count with the local clock count. At block 535, if the WM 300 determines that the counts are equal, the method continues and both the Host 400 and WM 300 continue their clock counts in another common timing reference period. If the WM 300 determines that the counts are not equal, at block 540, the WM 300 adjusts its local clock accordingly to match the Host clock more closely and the Host 400 and WM 300 continue their clock counts in another common timing reference period.

In the foregoing specification, the invention has been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. A method comprising:
    generating a local clock within a wireless module;
    counting a local clock count of the local clock during a common timing reference period that is common to the wireless module and a host and is maintained wirelessly between the wireless module and the host over a wireless link;
    receiving, from the host over the wireless link, a host clock count of a host clock during the common timing reference period; and
    adjusting the local clock based upon a comparison of the local clock count with the host clock count,
    wherein the common timing reference period is maintained wirelessly by:
    transmitting, from the host to the wireless module over the wireless link, a first control signal at a first predetermined interval;
    transmitting, from the wireless module to the host over the wireless link, a second control signal at a second predetermined interval;
    determining a difference in time between the transmitting of the first and second control signals; and
    adjusting the first predetermined interval or the second predetermined interval to bring the first and second predetermined intervals within a predetermined time difference tolerance.

2. The method of claim 1, further comprising:
    receiving a wireless transmission from the host, wherein the wireless transmission includes audio samples and a timestamp based upon a host timing reference; and
    outputting the audio sample at a time designated by the timestamp to a speaker.

3. The method of claim 2, wherein the timestamp includes a clock count in reference to the host timing reference.

4. The method of claim 1, wherein generating the local clock within the wireless module comprises:
    receiving a host clock frequency from the host; and
    generating a clock signal at the same frequency or derivative of the same frequency as the host clock frequency.

5. The method of claim 1, wherein generating the local clock within the wireless module comprises:
    receiving audio samples from the host;
    deriving a host clock frequency from the audio samples; and
    generating a clock signal at the same frequency or derivative of the same frequency as the host clock frequency.

6. The method of claim 1, further comprising:
    receiving, from the host over the wireless link, an initial host clock count during an initial period of the common timing reference period; and
    initializing the local clock count to the initial host clock count.

7. A wireless module comprising:
    a phase-locked loop (PLL) circuit to generate a local clock;
    a radio to receive, from a host over a wireless link, a host clock count of a host clock during a common timing reference period that is common to and is maintained wirelessly between the wireless module and the host over the wireless link; and a processing device coupled to the PLL and the radio, the processing device to count the local clock during the common timing reference period, and adjust the PLL based upon a comparison of the local clock count with the host clock count, wherein the radio receives, from the host over the wireless link, a first control signal at a first predetermined interval, transmits to the host over the wireless link, a second control signal at a second predetermined interval, and the processing device determines a difference in timing between the first and second control signals and adjusts the second predetermined interval to bring the first and second predetermined intervals within a predetermined time difference tolerance to maintain the common timing reference period.

8. The wireless module of claim 7, wherein
the radio to further receive a wireless transmission from the host, wherein the transmission includes audio samples and a timestamp based upon a host timing reference; and
the processing device to further output the audio samples at a time designated by the timestamp to a speaker.

9. The wireless module of claim 8, wherein the timestamp includes a clock count in reference to the host clock.

10. The wireless module of claim 7, wherein generating a local clock comprises:
the radio receiving a host clock frequency from the host; and
the processing device adjusting the PLL to generate a clock signal at the same frequency or derivative of the same frequency as the host clock frequency.

11. The wireless module of claim 7, wherein
the radio to further receive, from the host over the wireless link, an initial host clock count during an initial period of the common timing reference period; and
the processing device to initialize the local clock count to the initial host clock count.

12. The wireless module of claim 7, further comprising:
a voltage controlled oscillator (VCO) coupled to the processing device and the PLL, wherein the VCO receives a control voltage from the processing device and outputs a corresponding frequency input to the PLL to adjust the local clock.

13. The wireless module of claim 12, wherein the VCO is a voltage controlled crystal oscillator (VCXO).

14. A system comprising:
a host including
a host processing device to count a host clock;
a host radio to transmit the count of the host clock; and
a wireless module (WM) including
a phase-locked loop (PLL) circuit to generate a local clock,
a WM radio to receive, from the host over a wireless link, a count of a host clock count of the host clock during a common timing reference period that is common to and is maintained wirelessly between the WM and the host over the wireless link, and a WM processing device coupled to the PLL and the WM radio, the WM processing device to
count a local clock count of the local clock during the common timing reference period, and
adjust the PLL based upon a comparison of the local clock count with the host clock count,
wherein the WM radio receives, from the host over the wireless link, a first control signal at a first predetermined interval, transmits to the host over the wireless link, a second control signal at a second predetermined interval; and
the WM processing device determines a difference in timing between the first and second control signals and adjusts the second predetermined interval to bring the first and second predetermined intervals within a predetermined time difference tolerance to maintain the common timing reference period.

15. The system of claim 14, wherein
the WM radio to further receive a wireless transmission from the host, wherein the wireless transmission includes an audio sample and a timestamp based upon the common timing reference period; and
the processing device to output the audio sample at a time designated by the timestamp to a speaker.

16. The system of claim 15, wherein the timestamp includes a clock count in reference to a host timing reference.

17. The system of claim 14, wherein generating the local clock comprises:
the host radio transmitting a host clock frequency;
the WM radio receiving the host clock frequency; and
the WM processing device adjusting the PLL to generate a clock signal at the same frequency or derivative of the same frequency as the host clock frequency.

18. The system of claim 14, wherein
the host radio to further transmit an initial host clock count during an initial period of the common timing reference period;
the WM radio to further receive the initial host clock count; and
the processing device to initialize the local clock count to the initial host clock count.

19. The system of claim 14, wherein the WM further comprises:
a voltage controlled oscillator (VCO) coupled to the WM processing device and the PLL, wherein the VCO receives a control voltage from the WM processing device and outputs a corresponding frequency input to the PLL to adjust the local clock.

20. The wireless module of claim 19, wherein the VCO is a voltage controlled crystal oscillator (VCXO).

* * * * *